Jan. 31, 1933.　　　　　A. C. VISEL　　　　　1,895,870
ELECTRIC WATER HEATER
Filed Nov. 14, 1930
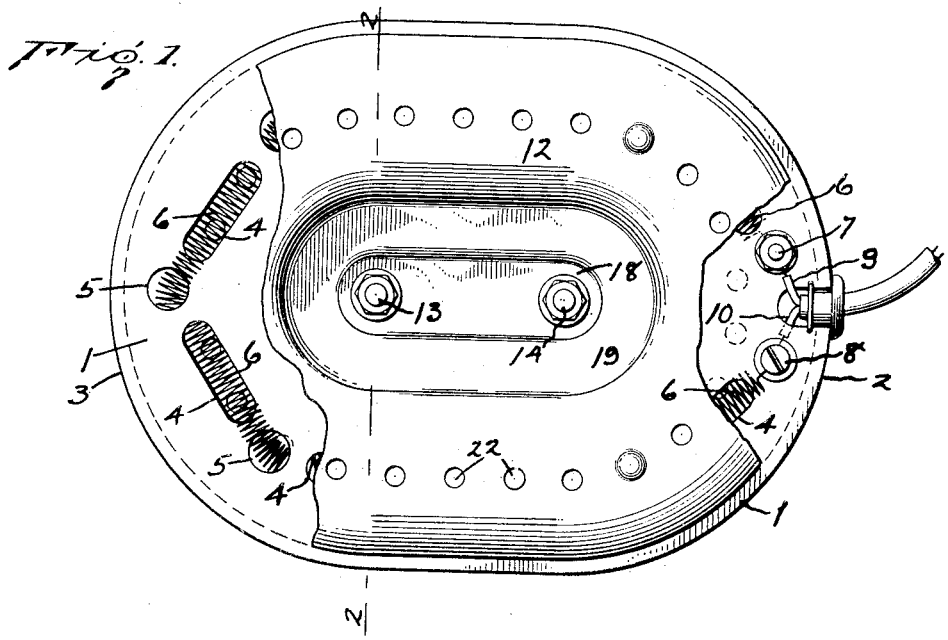
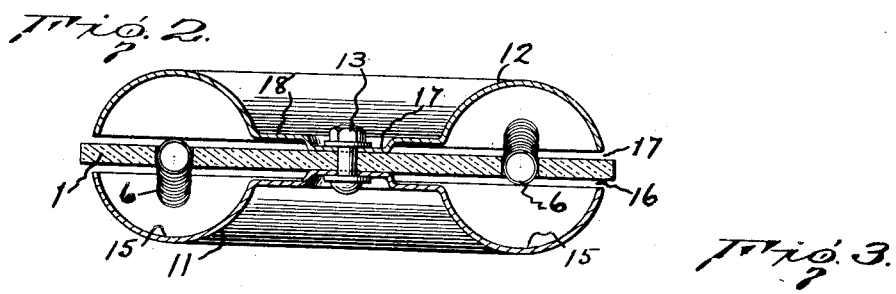
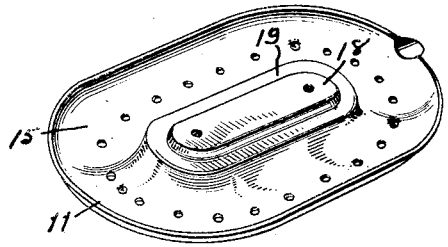
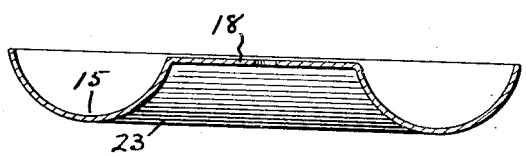
Inventor
August C. Visel
By Louis C. Vanderlip.
Attorney Patented Jan. 31, 1933

1,895,870

UNITED STATES PATENT OFFICE

AUGUST C. VISEL, OF BRONSON, MICHIGAN

ELECTRIC WATER HEATER

Application filed November 14, 1930. Serial No. 495,669.

My invention relates to portable electric water heaters.

An object of my invention is to provide a very compact light weight electric heater which may be readily placed within any water container for heating the water.

Another object of my invention is to provide an improved electric water heater which has a two part casing which effectually protects the operator against electric shocks and prevents accidental damage to the resistance coil mounted therein.

A third object of the invention is to provide an electric water heater of the readily portable type which has the heating unit mounted upon an insulating plate which is secured between the two sections of the heater casing in such a manner that the outer periphery of the insulating plate is arranged between the outer edges of the casing sections but spaced therefrom.

Other objects of the invention are mentioned and described herein.

An embodiment of my invention is illustrated in the accompanying drawing, wherein, Figure 1 is a top plan view of the heater, the casing whereof is broken away to disclose the heater coil, the binder posts &c;

Fig. 2 is a section taken on line 2—2 of Fig. 1;

Fig. 3 is a perspective view of one of the two casing sections illustrated in Figures 1 and 2;

Fig. 4 illustrates a modified form of the casing clamping means; and

Fig. 5 is a section taken through a casing section constructed for use with the clamping means illustrated in Fig. 4.

Similar numerals of reference indicate like parts throughout the several views on the drawing.

The numeral 1 indicates an insulating plate made of any suitable insulating material, somewhat elongated, preferably, and provided with the curvical ends 2 and 3. The plate 1 is provided with a series of alternately elongated and circular openings 4 and 5, respectively, which extend, as a series, about said plate adjacent the outer periphery thereof and in which series of openings the single strand electric heater coil or unit 6 is trained, arranged partially on both sides of said plate, the opposite ends of said heater unit being connected with the two binder posts 7 and 8, respectively, adjacent one end of the plate. Suitable electric conductor conduits 9 and 10 are connected with the binder posts 7 and 8, respectively.

The plate 1 is clamped between the opposed casing sections 11 and 12 by a pair of bolts 13 and 14 which traverse suitable apertures formed in both casing sections and in said insulating plate, said pair of bolts functioning also to prevent relative movement of said plate and casing sections, said casing sections 11 and 12 being wholly out of contact with each other. Each of the casing sections 11 and 12, which are preferably made of stamped metal, is shaped generally to conform to the contour of the insulating plate 1 and each is provided with an endless groove 15 which is curved on the ends thereof, thereby providing registering semi-chambers within which the heater coil 6 is arranged.

The casing grooves 15 register on opposite sides of the plate 6 to form a chamber within which the heater coil 6 extends, and whereby contact of said heater coil with the wall of said grooves is obviated.

The outer periphery of the plate 1 extends slightly beyond the outer edge of both the casing sections 11 and 12, and the outer edges of both the casing sections are spaced somewhat from the plate 1 at all points therearound to provide continuous water inlet openings 16 and 17, thereby facilitating the entry of water to the heater interior and into contact with the heater element 6. A plurality of outlet openings 22 in the wall of each casing section may also be provided.

Both of the casing sections 11 and 12 are alike in construction and each is provided with an elongated recess 18 stamped in the flattened and elongated portion 19 which is disposed within the grooved portion 15, and the inner face of said recessed portion 18 constitutes the sole point of engagement of said casing sections with the plate 1 when the latter is clamped between said casing sections by the bolts 13 and 14. The fastening means shown in Fig. 4 enables the production of a somewhat simpler and cheaper stamped metal casing section 23 which may dispense with the inner recess 18, but which includes the flattened recess 19, said fastening means including the two bolts 13 and 14 and a pair of apertured spacing disks or washers 20 and 21 carried by said bolts and interposed between the insulating plate 1 and the wall 18 of each of said casing sections.

I claim:

1. In an electric water heater of the class described comprising, a casing divided into centrally recessed half sections, an insulating plate, an electrical heating unit carried by said plate and arranged about the central portion thereof, and means for clamping said insulating plate between said casing sections, whereby the outer edge of said insulating plate is arranged between the outer edges of said casing sections but spaced therefrom.

2. In an electric water heater of the class described comprising, a casing divided into half sections, each casing half section being centrally recessed and provided with an endless groove extending about said centrally recessed portion, an insulating plate, an electrical heating coil carried by said plate and curvically extended thereon, and means for clamping said insulating plate between said casing sections and into engagement only with said casing recessed portions, and whereby said heating coil is arranged within said casing section grooves and spaced from the walls thereof.

3. In an electric water heater of the class described comprising, a casing divided into half sections, each casing half section being provided with a curvical endless groove and a recessed portion within said groove, an insulating plate, an electrical heating coil or unit carried by said plate and arranged partially on each side thereof, and means for clamping said insulating plate between said casing sections and gripped only between said casing section recessed portions, whereby said heating coil or unit is arranged within said casing grooves, and whereby the outer edge of said insulating plate is arranged between the outer edges of said casing sections and spaced therefrom.

4. In an electric water heater of the class described comprising a casing divided into half sections, an insulating plate, an electrical heating unit carried by said insulating plate, and means for clamping said insulating plate between said casing sections, whereby the outer edge of said insulating plate is arranged between the outer edges of said casing sections but spaced therefrom.

AUGUST C. VISEL.